United States Patent [19]

Davidson et al.

[11] 3,713,540
[45] Jan. 30, 1973

[54] APPARATUS FOR TREATING WASTE MATERIALS

[75] Inventors: Roger Davidson, Arlington Heights, Ill.; Fumio F. Sako, San Jose, Calif.

[73] Assignee: FMC Corporation

[22] Filed: April 15, 1971

[21] Appl. No.: 134,335

[52] U.S. Cl. .................... 210/391, 210/7, 210/19, 210/77, 210/81, 210/384, 210/402, 210/408
[51] Int. Cl. ............................................. B01d 33/06
[58] Field of Search....210/77, 81, 19, 217, 391, 392, 210/402, 404, 407, 408; 162/318, 325, 357, 384

[56] References Cited

UNITED STATES PATENTS

| 3,521,751 | 7/1970 | Holthuis | 210/391 X |
| 777,316 | 12/1904 | Tittel | 210/217 X |
| 3,468,423 | 9/1969 | LePechon | 210/402 X |
| 3,489,679 | 1/1970 | Davidson et al. | 210/391 X |

FOREIGN PATENTS OR APPLICATIONS

| 563,203 | 9/1958 | Canada | 210/402 |
| 552,030 | 1/1958 | Canada | 210/402 |

Primary Examiner—Michael Rogers
Attorney—Dressler, Goldsmith, Clement & Gordon

[57] ABSTRACT

The method of treating waste materials, such as sewage, involves introducing raw sewage into a body of aqueous medium, aerating said body of aqueous medium to maintain solids in suspension and to effect B.O.D. removal, withdrawing a sufficient volume of liquid containing a minor amount of solids for discharge as a surcharge free sewage disposal effluent to compensate for the volume of influent waste material in order to maintain a relatively constant volume for said body of aqueous medium, said withdrawn liquid being the filtrate which has passed through a movable filter subject to submerged surface cleaning so that the filter medium while submerged in said body of aqueous medium is being maintained substantially free of solids that normally would accumulate on the filter medium during the filtration of the solids suspension and prevent loss of filtration capacity by directing streams of fluid medium against the outer surface of the filter medium as it passes through the body of aqueous medium.

1 Claim, 4 Drawing Figures

PATENTED JAN 30 1973

3,713,540

INVENTORS
ROGER DAVIDSON
FUMIO F. SAKO

BY Dressler, Goldsmith, Clement &
Gordon
ATTORNEYS

APPARATUS FOR TREATING WASTE MATERIALS

This invention relates to the treatment of waste materials. More particularly, it relates to a process for aerobic treatment of sewage. Still more particularly, it relates to a method and apparatus for reducing the Biochemical Oxygen Demand of an aqueous medium containing sewage and for processing greater quantities of sewage per unit volume of the aeration tank without need for conventional associate settling units.

Briefly, the method for preparing clarified liquid medium from a liquid medium containing suspended solids comprises introducing said liquid medium into a container therefor, passing liquid within said container through a movable porous element which separates a first zone for the liquid medium containing suspended solids from a second zone for clarified liquid medium which has passed through said porous element, moving said porous element through a predetermined path about said second zone and maintaining the submerged surface thereof which is exposed to said suspension substantially free of solids during the filtering of the suspension by the impinging action of streams of fluid medium directed against said submerged surface and withdrawing clarified liquid medium from said second zone.

An apparatus for clarifying a liquid suspension comprises a container for said suspension means for introducing said liquid suspension into said container, a movable porous element which separates the introduced liquid suspension from a zone for clarified liquid, means submerged in said suspension for directing fluid into contact with said movable porous element to dislodge solids which are brought into contact with said element by the liquid that passes therethrough, said means for directing fluid submerged in said suspension being positioned adjacent the surface area of said porous element through which liquid passes into said zone for clarified liquid, said dislodging of solids being effected by impingement contact and means for discharging clarified liquid from said zone therefor.

In the treatment to effect separation of solids from liquid suspensions, the suspension is generally delivered to a quiescent tank for gravity settling of the solids or if faster separation is desired, to a tank equipped with a filter means having pores of a size to pass the liquid but to prevent passage of at least a major portion of the particulate solid matter. One of the primary disadvantages of gravity settling is the length of time required to produce an effluent having a solids content of less than about 30 parts per million (ppm). A primary disadvantage of filter means is that as solids are deposited on the screen, cloth, paper, etc., the solids block more and more of the pores and reduce the quantity of liquid which can pass therethrough until eventually the operation must be interrupted for replacement of a new filter means, or until the removed filter means can be subjected to such cleaning treatments as acid washing, water washing, etc., to remove solids from the pores and restore the porosity and original filtering capability.

Now it has been discovered, that suspensions of solids can be processed for production of a clarified liquor in markedly increased quantities by effecting a continuous submerged surface cleaning action to maintain the surface of the porous medium facing the suspension of solids substantially free of solids during the stage when liquid passes therethrough by directing streams of gas or liquid against the filter surface through which liquid is passing.

In one embodiment of the invention, as applied to the treatment of sewage for significant reductions in Biochemical Oxygen Demand (B.O.D.) in an aerobic process, clarification of quantities of liquid of the same order of magnitude as that of the influent sewage is effected directly from the suspension in the aeration tank while continuing to aerate the suspension and the high and reasonably constant rate of passage of liquid through the porous medium into an isolated accumulation zone for clarified liquor is maintained by cleaning action to keep that portion of the surface of the porous medium which is submerged in the suspension and through which liquid is passing, free of solids.

Control over the volume of liquid in the tank is provided indirectly by flow control means associated with the outlet pipe for effluent being withdrawn from the drum.

The filtration apparatus may take numerous forms depending upon the manner in which the filter medium will be given secondary cleaning action to keep the pores from becoming blinded by minute particles which become wedged in the pores and are not removed by the impinging action of the jets of fluid.

The form of secondary cleaning action will depend upon the manner in which the solids will be disposed. The solids can be dislodged preferably by ultrasonic vibrations created by a transducer or high pressure wash water jets operating in a direction opposite the direction of flow while filtration takes place, etc. When secondary cleaning is carried out within the tank, ultrasonic vibrations are created by a transducer positioned to effect cleaning shortly before the filter means moves into the submerged position where liquid passes therethrough.

One form of movable filter medium may be a continuous filter screen which is guided through the aeration tank by a perforate drum. Such a screen may be made up of fabric or metallic screening. Effectiveness of such screens as filter medium depends upon the size of the pores. When operating with a relatively high solids concentration in the liquid under aeration, a cloth with a nominal hole size of 20 microns, will generally produce a filtrate with 40 ppm to 80 ppm of solids. A screen of nominal 10 micron hole size will generally produce a filtrate of lesser solids concentration.

A treatment plant of this type is capable of operating in a variety of systems. The system can be used in a tank designed for concentrating of solids, in an aeration tank of an aerobic digestion system, in the aeration tank of an activated sludge system, etc.

One form of apparatus for clarifying liquid suspensions in accordance with this method may consist of a tank for a suspension of solids, a perforate drum mounted for at least partial submergence in said suspension, a continuous screen which is guided through the tank in contact with said drum and is a movable filter medium, fluid discharge means for dislodging solids brought into contact with said screen by the liquid passing therethrough, submerged in said suspension adjacent the area where the screen and drum cooperate for passage of liquid into the interior of said drum which remove solids by impingement contact and means for discharging clarified liquid from the interior of said drum.

In operations where a rotatable drum equipped with a porous surface capable of acting as a filter medium is completely submerged in the suspension, it is necessary to establish conditions for maintenance of atmospheric air pressure in that portion of the drum where air collects. Means for relieving the pressure developed by air trapped above the liquid outlet pipe, allows the hydraulic head difference between the liquid levels inside and outside the drum to maintain a fully effective straining capacity over substantially the entire screening surface.

The invention will be further understood from the following description of preferred embodiments of the invention taken in conjunction with the accompanying drawings in which.

Figure 3:
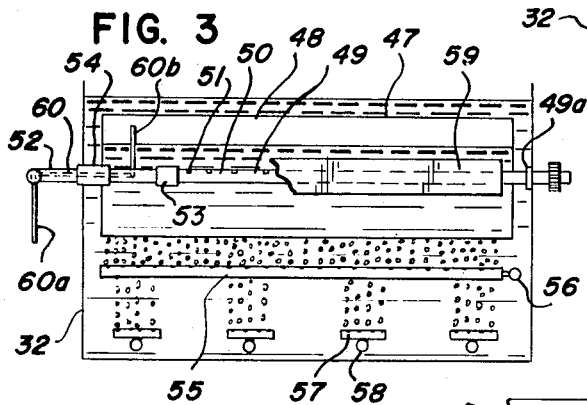
Figure 2:
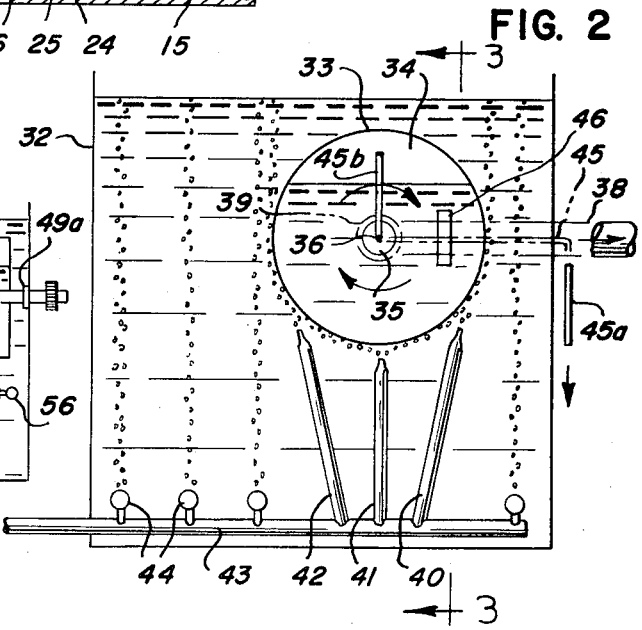
FIG. 2 is a vertical sectional view of a tank having air dispersers to keep solids in suspension, showing an end view of a rotatable drum having a porous surface to act as filter medium and air jets submerged in the suspension directed against the submerged surface of the drum.
Figure 4:
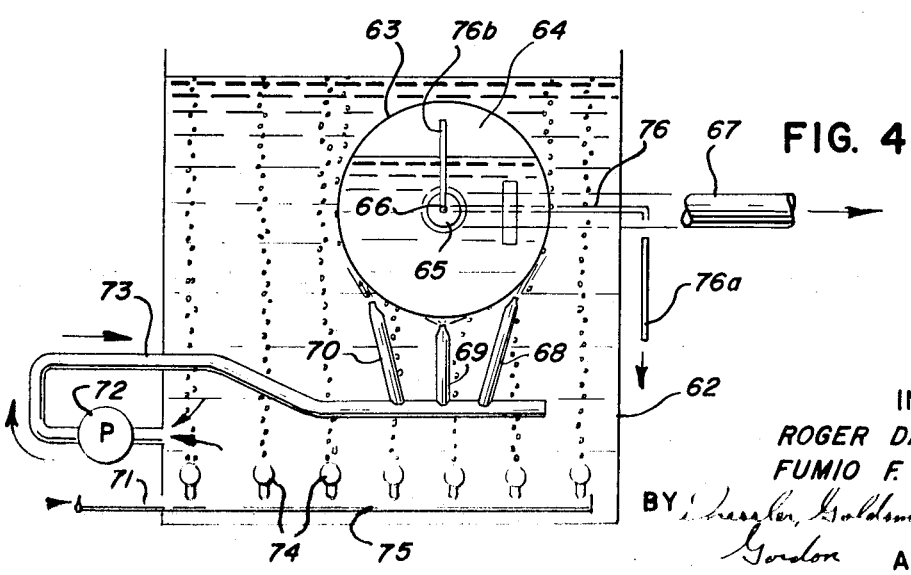

FIG. 3 is a vertical sectional view along the line 3—3 of FIG. 2 having air dispersers to keep solids in suspension and showing as a substitute for the air jets, gas dispersers of a length co-extensive with that of the drum filter; and FIG. 4 is a vertical sectional view of a tank having air dispersers to keep solids in suspension and a rotatable drum having a porous surface to act as filter medium and a pumping system to withdraw liquor from the tank and return it to the tank through nozzles directing the liquid streams against the submerged surface of the drum.

Figure 1:
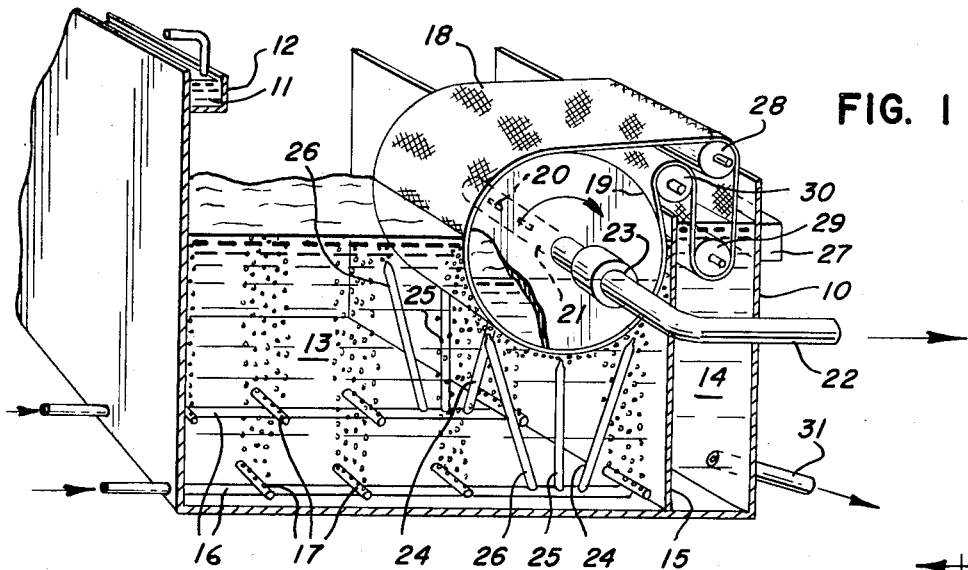
FIG. 1 is a perspective view of an aeration tank and a tank for concentration of solids to be wasted and fluid jet means submerged in the liquor with streams directed against the submerged portion of the movable filter screen.

In FIG. 1, the numeral 10 indicates a tank of suitable material of construction. A solids suspension is introduced into tank 10 through an influent channel 11 which permits flow into the tank over a weir 12. Tank 10 is divided into an aeration compartment 13 and a solids accumulation compartment 14 by a wall 15.

Aeration in tank 10 is effected by introducing air through headers 16 and dispersers 17 which delivers air from a conventional source not shown. Air dispersers 17 are provided with suitable control means for air flow, such as orifices, so that air flow from header 16 to the dispersers is balanced.

Liquid of the suspension passes through a movable endless screen 18. Endless screen 18 is guided through the compartment 13 by a rotatable drum 19 which has a perforate peripheral area. Rotatable drum 19 is mounted in a submerged position in the aeration compartment such that the level of liquid suspension in compartment 13 is above the outlet ports 20 for clarified liquid in the hollow central shaft 21 of drum 19. Shaft 21 communicates with outlet pipe 22 through a suitable packing gland or rotating seal 23.

As the endless screen 18 enters the liquid suspension and is guided in a submerged path therethrough, the surface thereof is contacted by air streams flowing from jets 24, 25 and 26 adopted with suitable control means such as orifices. Air from jet 24 contacts the screen 18 during its movement downwardly. Air from jet 25 contacts the screen in the area where travel direction changes from downwardly to upwardly and air from jet 26 contacts the screen as it moves upwardly, thus keeping the surface free of solids during its entire travel through the suspension.

The jet nozzles are positioned so that the effective impingement zones span the entire width of the screen 18. Operation of such jets may be intermittent if it is desired to have the screen act as one alternative way for removing some solids out of the tank as a means of preventing the solids content of the suspension from exceeding desired limits.

Any solids which may have been carried out of compartment 13 by screen 18 are dislodged as the screen is submerged in the liquid in compartment 14, preferably by an ultrasonic transducer 27, i.e., by sonic vibrations.

Movable screen 18 is power driven by motor means which is not shown, operating through drive pulley 28. After the screen has been sonically cleaned, the screen is directed by means of idler pulleys 29 and 30 to the compartment 13 where it begins another cycle.

Solids accumulated in compartment 14 are discharged through conduit 31.

In the embodiment illustrated in FIG. 2, the numeral 32 indicates a tank into which a solids suspension is introduced by suitable means.

Liquid of the suspension passes through the porous peripheral surface 33 of a rotatable drum 34. Rotatable drum 34 is completely submerged in the suspension. Drum 34 rotates about a central shaft 35 which has a central axial passage 36 therein and is provided with ports that furnish communication between the interior of the drum and said passage. Shaft 35 communicates with a stationary effluent outlet pipe 38 which extends to a point within the drum through a suitable packing gland or rotating seal 39 positioned within drum 34.

Stationary effluent outlet pipe 38 has extending through the section thereof that passes through the wall of tank 32 an air pipe 45 which is designed for free air flow without control means and extends from a point outside the tank 32 to a point a short distance within the end wall of the drum 34 and adjacent the seal 39. Air pipe 45 has an air outlet section 45a which extends through the sidewall of outlet pipe 38 so that the open end thereof communicates with the atmosphere and is free draining outside the tank 32 and a section 45b which extends upwardly through the wall of the section of liquid outlet pipe 38 which is within said drum to a point within the segment of drum 34 where air accumulates.

As the drum 34 rotates, the surface of the bottom peripheral segment of the drum is contacted by air streams flowing from jets 40, 41 and 42 which communicate with an air header 43 which also serves to support gas dispersers 44 that provide the agitation required to keep the solids content of the liquid in suspension. As the half of the peripheral surface of drum 34, moving through the semi-circular path, above the horizontal diametrical axis approaches the point where movement will be below the horizontal diametrical axis, any solids which may be adhering thereto are dislodged preferably by an ultrasonic transducer 46 mounted in a fixed position within said drum 34.

In the embodiment illustrated in FIG. 3, the numeral 32 indicates the tank into which a solids suspension is introduced by suitable means.

Liquid in the suspension passes through the porous peripheral surface 47 of a rotatable drum 48. Rotatable drum 48 is supported by a central shaft 49 which shaft is in turn supported by a bearing 49a secured in the wall of tank 32 so as to be completely submerged in the suspension. Drum 48 rotates about central shaft 49 which has a central axial passage 50 therethrough and is provided with ports 51 that furnish communication between said passage and the liquid holding interior of said drum. Shaft 49 communicates with a stationary liquid outlet pipe 52 through a suitable packing gland of rotatable seal 53. Outlet pipe 52 extends from outside the tank to a point within the drum 48 through a combination bearing-seal means 54 which also provide support for the liquid outlet end of said drum.

As the drum 48 rotates, irrespective of direction, the surface of the bottom peripheral segment thereof is contacted by streams of rising bubbles flowing from a plurality of gas dispersers 55 such as the type formed by wrapping cord about a hollow foraminated core or by attaching a cloth sleeve member to a fixture having an air passage therethrough adapted to communicate with the interior of the sleeve. Dispersers 55 are supported by their connection with a header 56.

Agitation to maintain the solids in the suspension is provided by injection of air through dispersers 57 positioned adjacent the bottom of the tank which dispersers communicate with an air header 58. As the drum 48 rotates and approaches the area where the surface of the drum is subject to the impinging action of rising gas bubbles, any solids which may adhere thereto are dislodged preferably by an ultrasonic transducer 59 illustrated as mounted in a fixed position within said drum 48. This is the preferable position, but said transducer may be positioned outside said drum.

Liquid outlet pipe 52 has within it an air pipe 60 which is designed for free air flow and extends through that position of said means for discharging clarified liquid which extends through said bearing-seal means 54 from a point outside the tank 32 to a point within the drum 48 adjacent the seal 53. Air pipe 60 has an air outlet section or branch 60a, which extends through the wall of liquid outlet pipe 52 so that the open end thereof communicates with the atmosphere outside tank 32 and a section or branch 60b which extends upwardly through the wall of the section of stationary outlet pipe 52 and through the space initially bounded by said seal 53 and the end wall of drum 48, to a point within the segment of drum 48 where air accumulates.

In the embodiment illustrated in FIG. 4, the numeral 62 indicates a tank into which a solids suspension is introduced by suitable means.

Liquid of the suspension passes through the porous peripheral surface 63 of a rotatable drum 64. Rotatable drum 64 is completely submerged in the suspension. Drum 64 rotates about a central shaft 65 which has a central axial passage 66 therein and is provided with ports that furnish communication between said passage and the interior of said drum. Shaft 65 communicates with outlet pipe 67 through a suitable packing gland or rotatable seal.

As the drum 64 rotates, the surface of the bottom peripheral segment thereof is contacted by liquid streams flowing from jets 68, 69 and 70. Liquid discharged from the jets is liquid withdrawn from the tank 62 through pipe 71 which communicates with a pump 72. Pump 72 discharges liquid through conduit 73 which delivers the liquid to said jets.

Agitation to keep the solids in suspension in tank 62 is provided by gas introduced by means of dispersers 74. Dispersers are supported by their communication connections with a header 75 which delivers air from a source that is not shown.

Liquid outlet pipe 66 has within it an air pipe 76 which extends from a point outside tank 62 to a point within the drum 64. Air pipe 76 has an air outlet section 76a which extends through the wall of liquid outlet pipe 66 so that the open end thereof communicates with the atmosphere outside tank 62 and a section 76b which extends upwardly through the wall of pipe 66 through the space inside of said drum and adjacent the end wall of drum 64 to a point within the segment of drum 64 where air accumulates.

We claim:

1. Apparatus for clarifying a liquid suspension comprising a container for said suspension, means for introducing said liquid suspension into said container, a movable porous drum provided with a peripheral surface screen which separates the introduced liquid suspension from a zone for clarified liquid, means submerged in said suspension and positioned below the bottom segment of said movable porous drum for directing fluid into impingement contact with said drum to dislodge solids which are brought into contact with said movable drum by the liquid that passes therethrough, piping means for discharging liquid from said zone for clarified liquid extending from outside said tank to within said drum through a bearing-seal means and an air conduit extending thru that portion of said piping means for discharging clarified liquid which passes thru said bearing-seal means with a branch within said drum which extends through the wall of said piping means for discharging liquid upwardly to the segment within said drum where air accumulates and a branch outside said tank which extends thru the wall of said piping means for discharging liquid for communication with the atmosphere.

* * * * *